United States Patent
Tseng

(10) Patent No.: US 7,679,682 B2
(45) Date of Patent: Mar. 16, 2010

(54) CONTROL METHOD FOR INTEGRATING A DISPLAY DEVICE WITH A DIGITAL TELEVISION MODULE

(75) Inventor: Shih-Hua Tseng, Taipei (TW)

(73) Assignee: Tatung Company, Taipei (TW)

( * ) Notice: Subject to any disclaimer, the term of this patent is extended or adjusted under 35 U.S.C. 154(b) by 1053 days.

(21) Appl. No.: 11/362,781

(22) Filed: Feb. 28, 2006

(65) Prior Publication Data
US 2007/0143821 A1 Jun. 21, 2007

(30) Foreign Application Priority Data
Dec. 16, 2005 (TW) .............................. 94144683 A

(51) Int. Cl.
*H04N 3/27* (2006.01)
*H04N 9/64* (2006.01)
*H04N 5/64* (2006.01)

(52) U.S. Cl. .................. 348/554; 348/721; 348/839

(58) Field of Classification Search ................ 348/721, 348/839, 725, 554, 555, 731, 552; 725/151–153
See application file for complete search history.

(56) References Cited

U.S. PATENT DOCUMENTS

| 5,649,318 | A | * | 7/1997 | Lusignan | ...................... 725/70 |
| 6,014,178 | A | * | 1/2000 | Jeon et al. | ................... 348/554 |
| 6,091,458 | A | * | 7/2000 | Jeon et al. | ................... 348/554 |
| 6,369,855 | B1 | * | 4/2002 | Chauvel et al. | ........... 348/423.1 |

* cited by examiner

*Primary Examiner*—Victor Kostak
(74) *Attorney, Agent, or Firm*—Bacon & Thomas PLLC

(57) ABSTRACT

A control method for integrating a display device with a digital television (DTV) module, which includes the steps: (A) using the display device to execute a system program; (B) determining whether the display device is in a digital television mode; (C) further determining whether the display device receives an instruction when step (B) decides that the display device is in the digital television mode; (D) further determining whether the instruction received is for the digital television module when step (C) decides that the display device receives the instruction; and (E) using the display device to send the instruction to the digital television module through a serial bus and to receive and process a response of the digital television module when step (D) decides that the instruction is for the digital television module.

7 Claims, 6 Drawing Sheets

CONTROL METHOD FOR INTEGRATING A DISPLAY DEVICE WITH A DIGITAL TELEVISION MODULE

BACKGROUND OF THE INVENTION

1. Field of the Invention

The invention relates to a control technique of digital television and, more particularly, to a control method for integrating a display device with a digital television module.

2. Description of Related Art

As semiconductor processes have developed rapidly, more transistors can be integrated in a same area such that electronic devices have the enhanced functions and also the electronic devices can be made light, thin and small. Liquid crystal display televisions that generally represent the high-technology image have the advantage of miniaturization, as compared to typical CRT televisions. In addition, liquid crystal televisions have a wide screen to provide a preferred visual enjoyment.

However, a typical liquid crystal display television (LCD TV) cannot receive a digital television (DTV) signal to display a DTV program unless a set-top-box (STB) is provided. FIG. 1 is a schematic view of a typical LCD TV 100 connecting with an STB 150. As shown in FIG. 1, the STB 150 receives a DTV signal and decodes the signal into a video signal and an audio signal. The video signal and the audio signal are sent to the LCD TV 100 through a video connection 140 and an audio connection 145 respectively.

When a user desires to change a selected DTV channel, an STB remote controller 160 is used to perform associated settings on the STB 150. When the user desires to change the brightness of the DTV screen or volume of the DTV, a TV remote controller 130 is used. Accordingly, it leads the increased cost and inconvenience in use to the user.

Therefore, it is desirable to provide an improved method to mitigate and/or obviate the aforementioned problems.

SUMMARY OF THE INVENTION

An object of the invention is to provide a control method for integrating a display device with a digital television module, which integrates the digital television module into the display device to thus save the cost and the required power.

Another object of the invention is to provide a control method for integrating a display device with a digital television module, which integrates the digital television module into the display device to thus enhance the convenience in use.

A further object of the invention is to provide a control method for integrating a display device with a digital television module, which allows the display device to automatically determine to have a digital television mode, or to have a standard television mode only, to accordingly produce two types of television with high and low prices by a producer.

In accordance with one aspect of the present invention, there is provided a control method for integrating a display device with a digital television module. The control method includes the steps: (A) using the display device to execute a system program; (B) determining whether the display device is in a digital television mode; (C) further determining whether the display device receives an instruction when step (B) decides that the display device is in the digital television mode; (D) further determining whether the instruction received is for the digital television module when step (C) decides that the display device receives the instruction; and (E) using the display device to send the instruction to the digital television module through a serial bus and to receive and process a response of the digital television module when step (D) decides that the instruction is for the digital television module.

Other objects, advantages, and novel features of the invention will become more apparent from the following detailed description when taken in conjunction with the accompanying drawings.

DETAILED DESCRIPTION OF THE PREFERRED EMBODIMENT

The control method for integrating a display device with a digital television module can provide the command and message transfer between microprocessors of the display device and the digital television module in integration.

Figure 1:
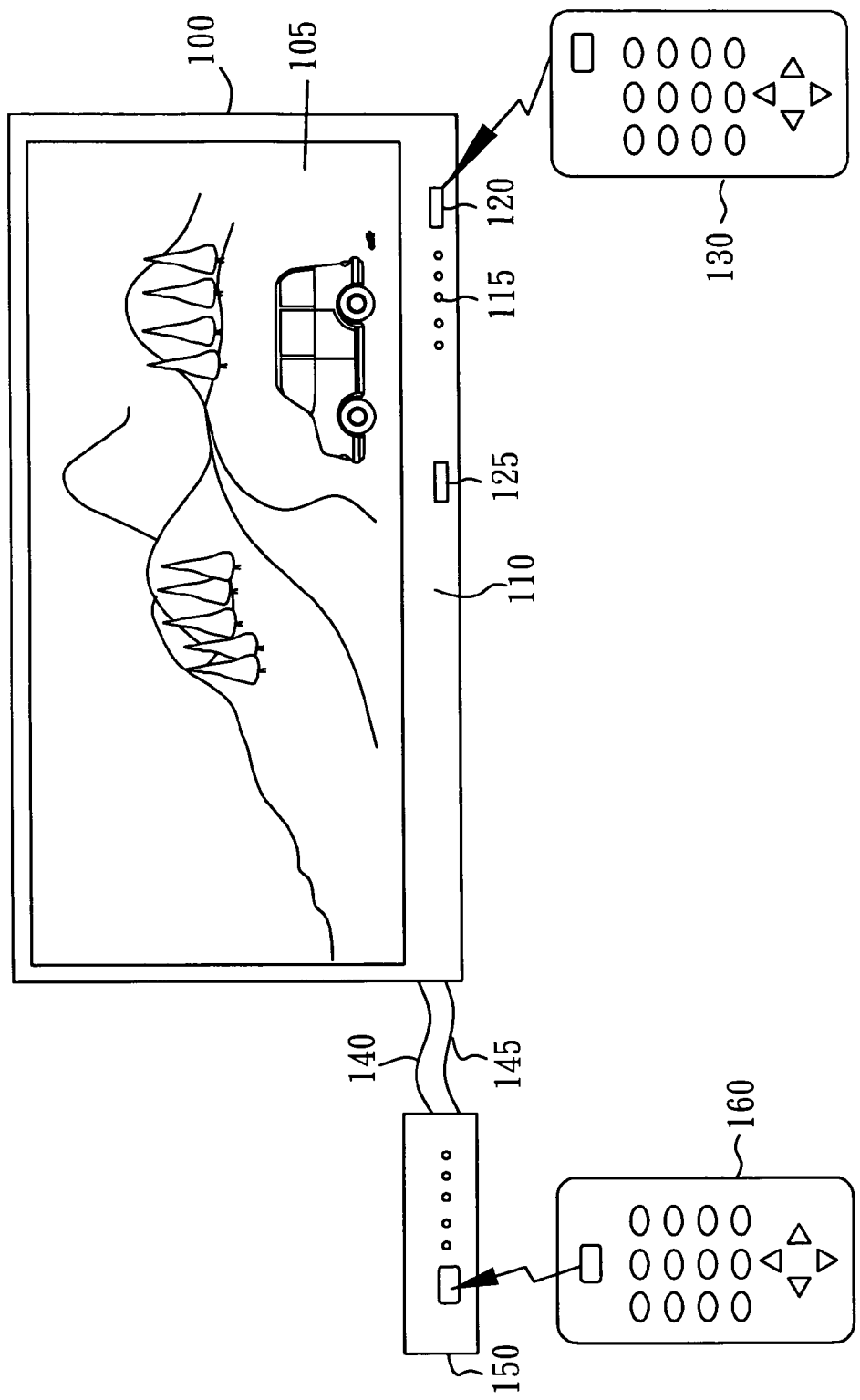
FIG. 1 is a schematic view of a typical liquid crystal television connecting an STB.
Figure 2:
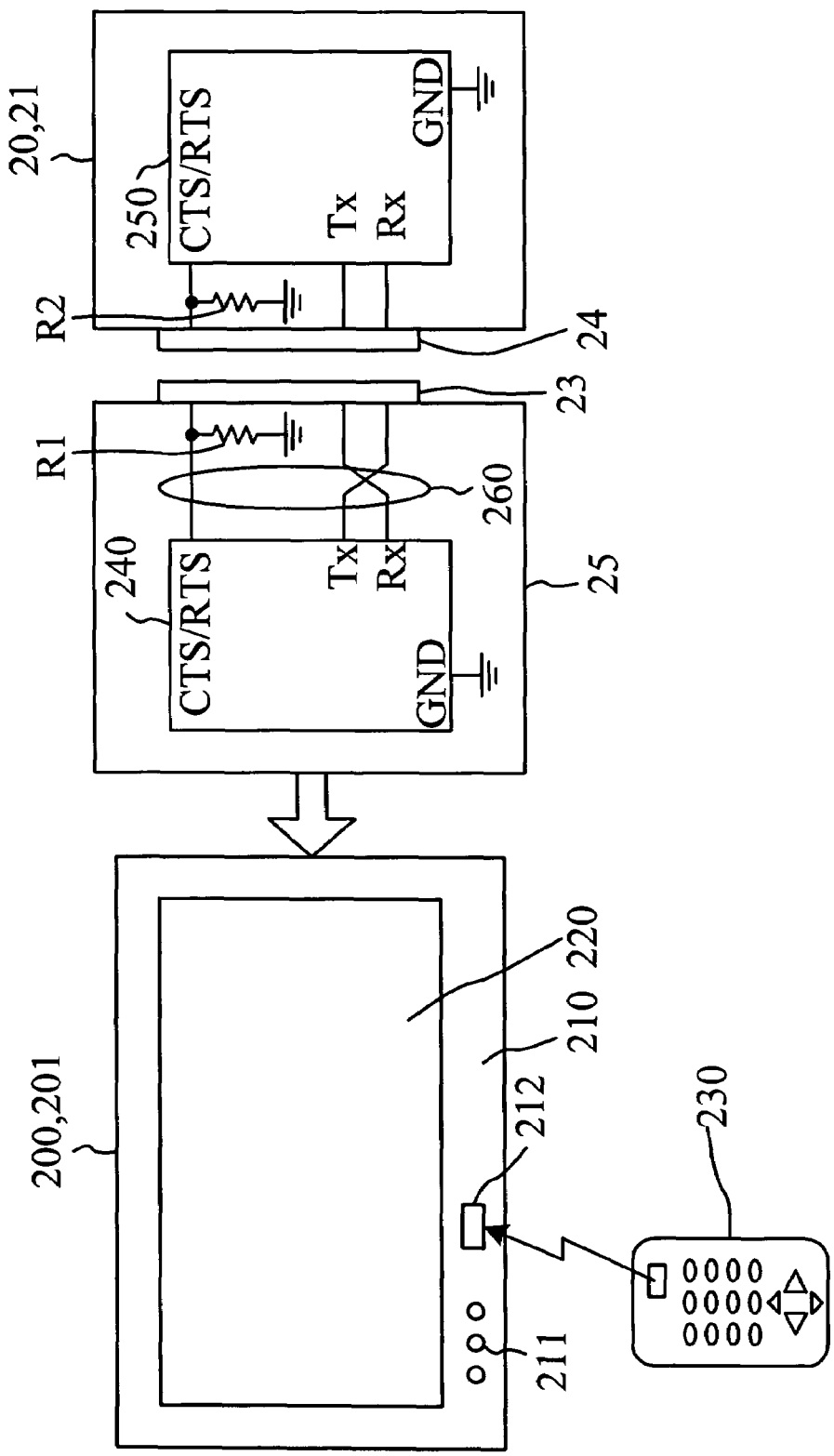
FIG. 2 is a schematic view of a display device and integrated digital television module in accordance with the invention.

FIG. 2 is a schematic view of a display device 200 and integrated digital television module 20 in accordance with the invention. As shown in FIG. 2, the display device 200 is preferably a liquid crystal display television (LCD TV) 201, and the digital television (DTV) module 20 is preferably a set-top-box (STB) module 21. The LCD TV 201 includes a liquid crystal display (LCD) 220 and an operating panel 210. The LCD 220 can display a video signal. The operating panel 210 has plural keys 211 and an infrared receiver 212. The keys 211 are used to input an instruction to the LCD TV 201 for performing associated settings. The infrared receiver 212 can receive an instruction sent by an infrared remote controller 230 to accordingly perform associated settings.

The STB module 21 can be integrated into a motherboard 25 of the LCD TV 201, or connect with the motherboard 25 of the LCD TV 201 through connectors 24 and 23. A TV microprocessor 240 of the LCD TV 201 and an STB microprocessor 250 of the STB module 21 are connected by a modified serial bus 260. The modified serial bus 260 includes an indicative line CTS/RTS, a transmit line Tx and a receive line Rx, each connected to both the STB microprocessor 250 of the STB module 21 and the TV microprocessor 240 of the motherboard 25 of the LCD TV 201. When two ends of the indicative line CTS/RTS have a high potential, the display device 200 and the DTV module 20 can deliver a packet data through the corresponding Tx and Rx line. In addition, when the STB module 21 is not connected electrically with the motherboard 25 of the LCD TV 201, the TV microprocessor 240 of the motherboard 25 of the LCD TV 201 can detect the state of the CTS/RTS line, and automatically exclude the DTV mode and turn into the standard TV mode.

Figure 3:
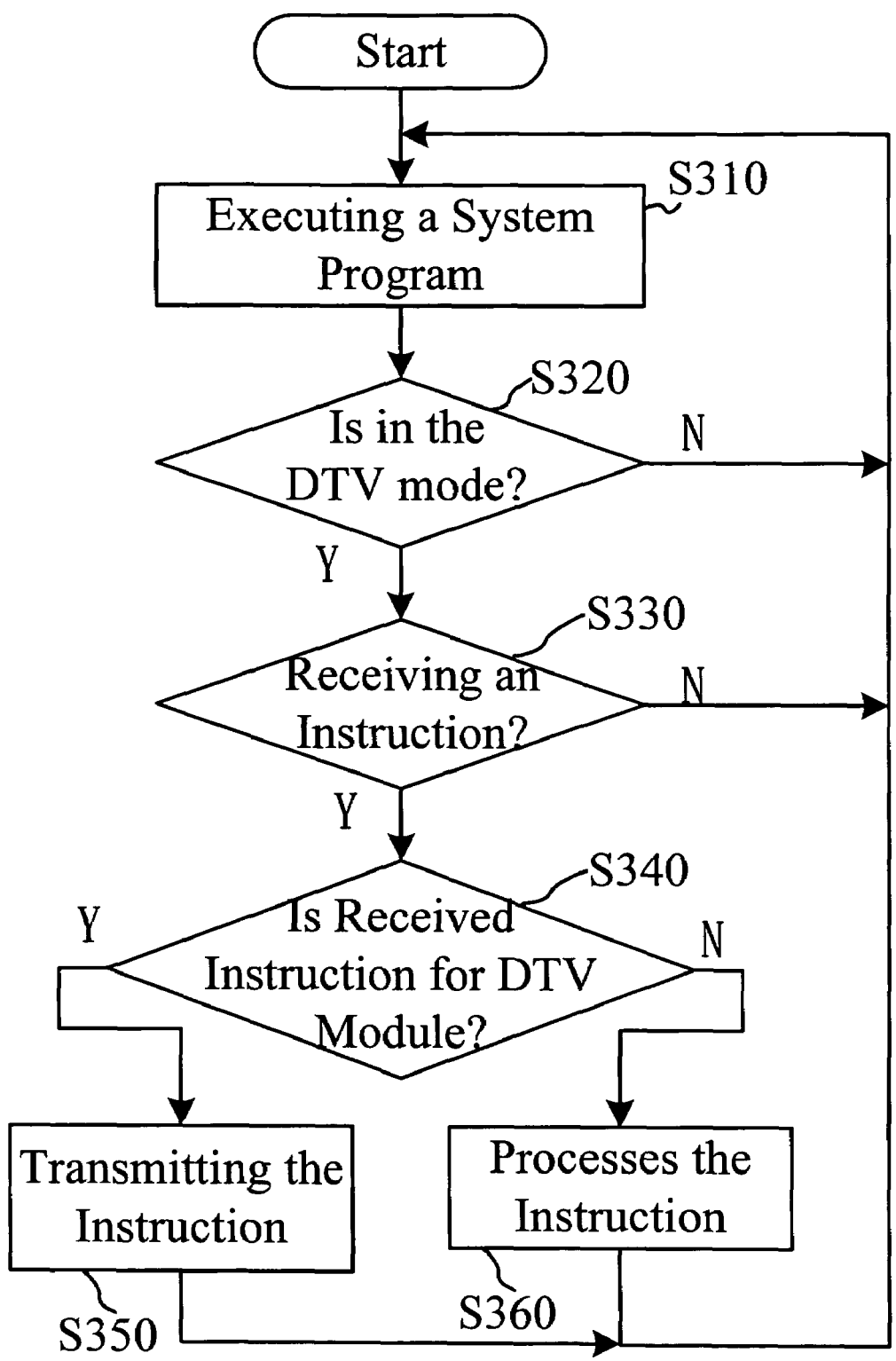
FIG. 3 is a flowchart of a control method for integrating a display device with a digital television module in accordance with the invention.

FIG. 3 is a flowchart of a control method for integrating a display device with a digital television module in accordance with the invention. In step S310, the TV microprocessor 240 of the display device 200 executes a system program. In step S320, the TV microprocessor 240 determines if the display device 200 is in the DTV mode. In step S330, the TV microprocessor 240 further determines if the display device 200 receives an instruction when step S320 decides that the display device 200 is in the DTV mode. The instruction can come from the keys 211 of the operating panel 210 of the display device 200 or the infrared remote controller 230.

Accordingly, step S340 further determines if the instruction received is for the DTV module 20 when step S330 decides that the display device 200 receives the instruction. When step S340 decides that the instruction is for the digital television module 20, the TV microprocessor 240 of the display device 200 transmits the instruction to the STB microprocessor 250 of the DTV module 20 through the modified serial bus 260, and receives a response of the DTV module 20. When step S340 decides that the instruction is not of the DTV module 20, the TV microprocessor 240 of the display device 200 processes the instruction (step S360).

When step S330 determines that the display device 200 does not receive the instruction, step S310 is executed. When step S320 determines that the display device 200 is not in the DTV mode, step S310 is executed.

In step S350, the TV microprocessor 240 uses a packet to transmit the instruction to the STB microprocessor 250 of the DTV module 20, and receive the response of the STB microprocessor 250 of the DTV module 20 through the modified serial bus. The packet can carry a message, including command message, command acknowledge message, response message, response acknowledge message, notification message and notification acknowledge message.

The command message is sent from the TV microprocessor 240 to the STB microprocessor 250 of the DTV module 20 in order to carry a command to the DTV module 20 or ask the DTV module 20 to send an information back to the TV microprocessor 240. The command acknowledge message is sent from the STB microprocessor 250 of the DTV module 20 to the TV microprocessor 240 in order to acknowledge that the STB microprocessor 250 of the DTV module 20 receives a command message.

The response message is sent from the STB microprocessor 250 of the DTV module 20 to the TV microprocessor 240 in response to a command message received by the STB microprocessor 250 of the DTV module 20. The response acknowledge message is sent from the TV microprocessor 240 to the STB microprocessor 250 of the DTV module 20 in order to acknowledge that the TV microprocessor 240 receives a response message.

The notification message is sent from the STB microprocessor 250 of the DTV module 20 to the TV microprocessor 240 in order to notify the TV microprocessor 240 that the DTV module 20 generates an event. The notification acknowledge message is sent from the TV microprocessor 240 to the STB microprocessor 250 of the DTV module 20 in order to acknowledge that the TV microprocessor 240 receives a notification message.

Figure 4:
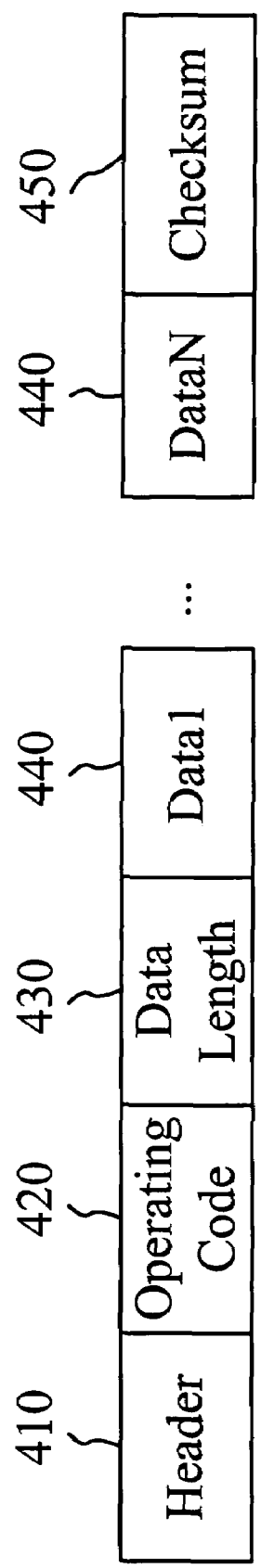
FIG. 4 is a schematic view of fields of a packet in accordance with the invention.

FIG. 4 is a schematic view of fields of a packet in accordance with the invention. As shown in FIG. 4, the packet has a header field 410, an operating code field 420, a data length field 430, data fields 440 and a checksum field 450. The header field 410 has eight bits filled in a value of 0xEA. The operating code field 420 has eight bits filled in a command. The data length field 430 has eight bits filled in the number of data and checksum fields. Each data field 440 has eight bits filled in a value of data, and is eliminated when the message carried by a packet is an acknowledge message. The checksum field 450 has eight bits filled in a value obtained by performing a checksum operation on all previous fields.

Figure 5:
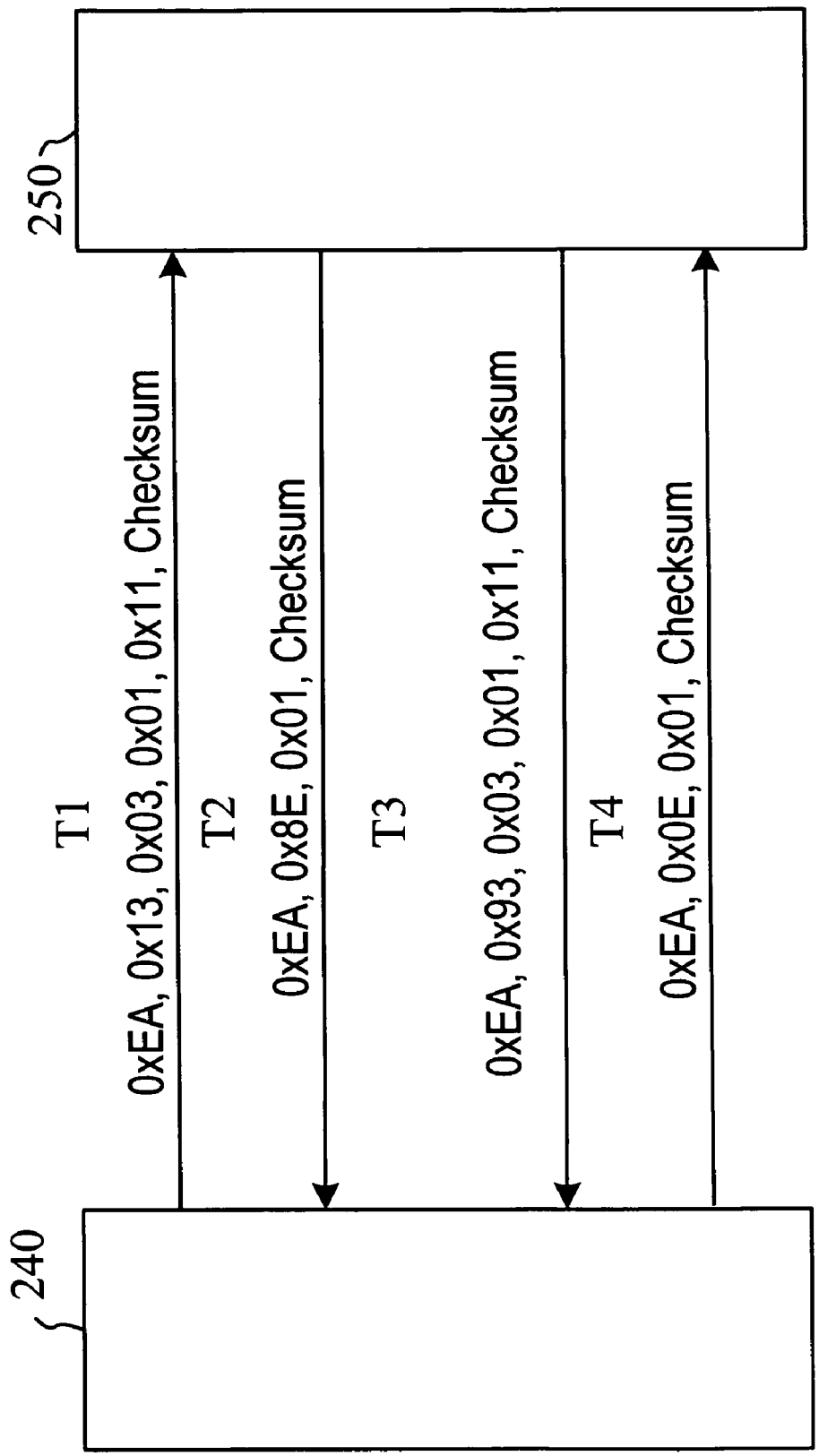
FIG. 5 is a schematic view of a message transmission in accordance with the invention.

FIG. 5 is a schematic view of a message transmission in accordance with the invention. As shown in FIG. 5, the TV microprocessor 240 sends a packet of setting channel number request to the STB microprocessor 250. At T1, the TV microprocessor 240 sends a command message to ask the STB microprocessor 250 for setting channel number to 0x11. The command message is sent in a packet form of 0xEA, 0x13, 0x03, 0x01, 0x11, Checksum corresponding to the header field 410, the operating code field 420, the data length field 430 to indicate two data fields and one checksum field, the first data field 1, the second data field 2, the checksum field, respectively. At T2, the STB microprocessor 250 returns a command acknowledge message to indicate that the command message is received. The command acknowledge message is sent in a packet form of 0xEA, 0x8E, 0x01, Checksum.

At T3, the STB microprocessor 250 sends a response message in a packet form of 0xEA, 0x93, 0x03, 0x01, 0x11, Checksum. At T4, the TV microprocessor 240 returns a response acknowledge message to indicate that the response message is received. The response acknowledge message is sent in a packet form of 0xEA, 0x0E, 0x01, Checksum.

Figure 6:
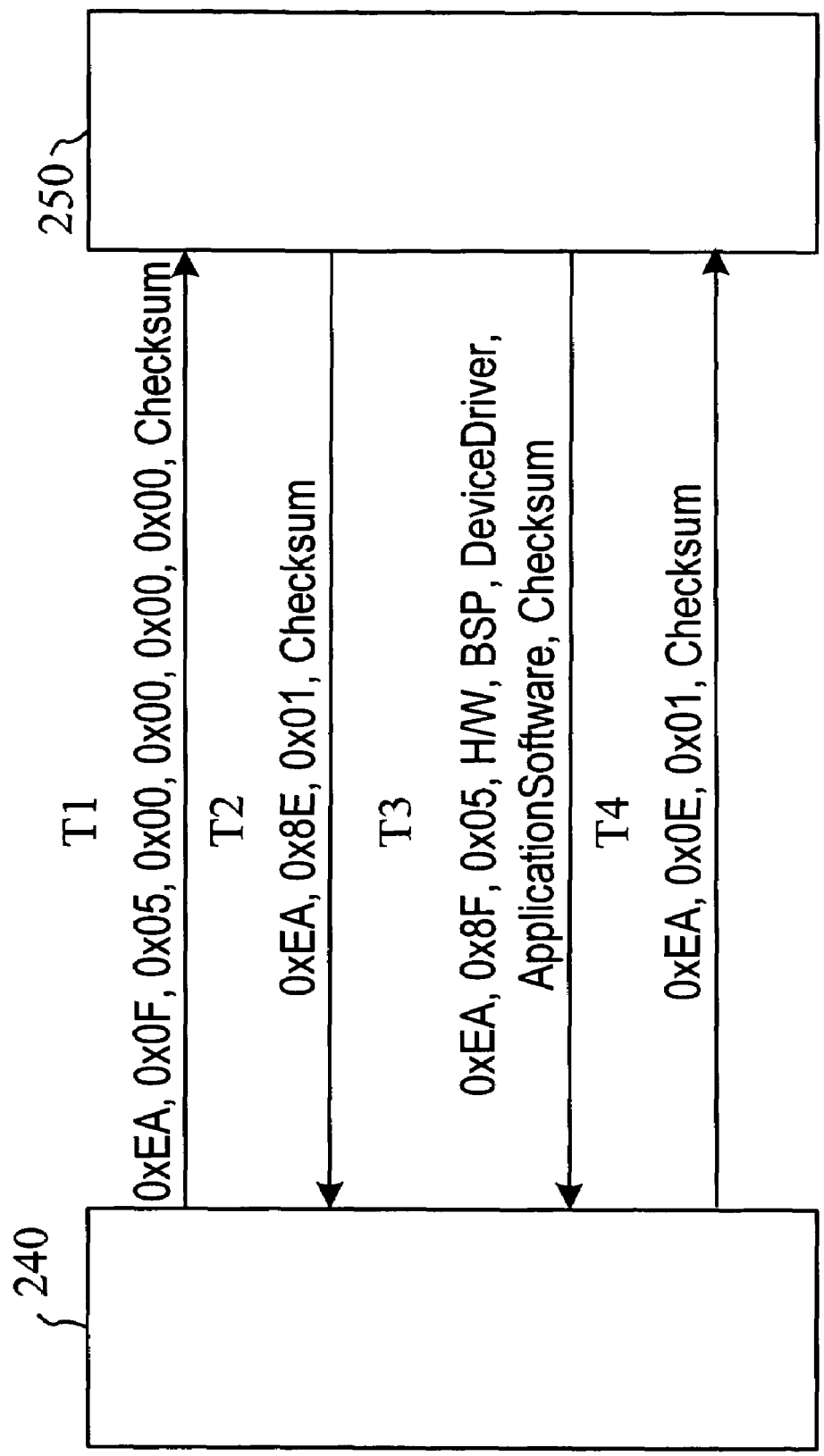
FIG. 6 is a schematic view of another message transmission in accordance with the invention.

FIG. 6 is a schematic view of another message transmission in accordance with the invention. As shown in FIG. 6, at T1, the TV microprocessor 240 sends a command message to ask the STB microprocessor 250 for sending a version information of the DTV module 20. The command message is sent in a packet form of 0xEA, 0x0F, 0x05, 0x00, 0x00, 0x00, 0x00, Checksum corresponding to the header field 410, the operating code field 420, the data length field 430 to indicate four data fields and one checksum field, the first data field 1, the second data field 2, the third data field 3, the fourth data field 4, the checksum field, respectively. At T2, the STB microprocessor 250 returns a command acknowledge message to indicate that the command message is received. The command acknowledge message is sent in a packet form of 0xEA, 0x8E, 0x01, Checksum.

At T3, the STB microprocessor 250 sends a response message in a packet form of 0xEA, 0x8F, 0x05, H/W, BSP, DeviceDriver, ApplicationSoftware, and Checksum. At T4, the TV microprocessor 240 returns a response acknowledge message to indicate that the response message is received. The response acknowledge message is sent in a packet form of 0xEA, 0x0E, 0x01, and Checksum. Accordingly, the display device can accurately transfer the instructions of the DTV module. Thus, the purpose of integrating the DTV module with the display device is achieved.

In view of the foregoing, it is known that, in the present invention, a display device can use the inventive technique to integrate with a DTV module, which can eliminate one remote controller. In addition, since the DTV module is integrated into the display device, the power can be saved, and the connections between the STB and the LCD TV can be reduced.

Although the present invention has been explained in relation to its preferred embodiment, it is to be understood that many other possible modifications and variations can be made without departing from the spirit and scope of the invention as hereinafter claimed.

What is claimed is:

1. A control method for integrating a display device with a digital television module, comprising the steps of:
 (A) using the display device to execute a system program;
 (B) determining whether the display device is in a digital television mode, and executing step (A) when step (B) decides that the display device is not in the digital television mode;

(C) further determining whether the display device receives an instruction when step (B) decides that the display device is in the digital television mode, and executing step (A) when step (C) decides that there is no instruction received;

(D) further determining whether the instruction received is for the digital television module when step (C) decides that the display device receives the instruction;

(E) using the display device to send the instruction to the digital television module through a serial bus and to receive and process a response of the digital television module when step (D) decides that the instruction is for the digital television module, wherein the serial bus is a modified serial bus, and the modified serial bus comprises an indicative line, a transmit line and a receive line respectively connected to the digital television module and the display device; and (F) using the display device to process the instruction when step (D) decides that the instruction is not for the digital television module.

2. The control method as claimed in claim 1, wherein the display device and the digital television module that are integrated is allowed to deliver a packet through the transmit and receive lines when the indicative line is at a high potential.

3. The control method as claimed in claim 2, wherein the packet carries a message, and the message is one of the following types: a command message, a command acknowledge message, a response message, a response acknowledge message, a notification message and a notification acknowledge message.

4. The control method as claimed in claim 1, wherein the instruction originates from a key of an operating panel of the display device.

5. The control method as claimed in claim 1, wherein the instruction originates from an infrared remote controller.

6. The control method as claimed in claim 1, wherein the digital television module is detachable from the display device.

7. The control method as claimed in claim 6, wherein the display device automatically turns into a standard television module when the digital television module is detached from the display device and the indicative line is at a low potential.

* * * * *